United States Patent
Chen et al.

(10) Patent No.: US 7,286,179 B2
(45) Date of Patent: Oct. 23, 2007

(54) DEFECTIVE PIXEL FILTERING FOR DIGITAL IMAGERS

(75) Inventors: Zhiliang Julian Chen, Plano, TX (US); Eugene G. Dierschke, Dallas, TX (US); Steven Derek Clynes, Allen, TX (US); Anli Liu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 771 days.

(21) Appl. No.: 10/798,211

(22) Filed: Mar. 10, 2004

(65) Prior Publication Data
US 2004/0169746 A1   Sep. 2, 2004

(51) Int. Cl.
*H04N 9/64* (2006.01)

(52) U.S. Cl. ..................................... 348/346

(58) Field of Classification Search ............. 348/222.1, 348/241, 246, 247
See application file for complete search history.

(56) References Cited

U.S. PATENT DOCUMENTS

| | | | | |
|---|---|---|---|---|
| 4,167,754 A | * | 9/1979 | Nagumo et al. | 348/247 |
| 5,327,246 A | * | 7/1994 | Suzuki | 348/246 |
| 5,995,675 A | * | 11/1999 | Hwang | 382/268 |
| 6,509,927 B1 | * | 1/2003 | Prater et al. | 348/222.1 |
| 6,707,493 B1 | * | 3/2004 | Lee et al. | 348/246 |

* cited by examiner

*Primary Examiner*—Vivek Srivastava
*Assistant Examiner*—Timothy J Henn
(74) *Attorney, Agent, or Firm*—William B Kempler; W. James Brady, III; Frederick J. Telecky, Jr.

(57) ABSTRACT

Defective pixels in a CMOS array give rise to spot noise that diminishes the integrity of the resulting image. Because CMOS arrays and digital logic can be fabricated on the same integrated circuit using the same processing technology and relatively inexpensive and fast circuit can be employed to digitally filter the pixel data stream and to identify pixels having values that do not fall in the range defined by the immediately neighboring pixels and the deviate from the neighboring pixels by more than a threshold amount. Such conditions would indicate that the deviation is caused by a defective pixel rather than by desired image data. The threshold amount can be preprogrammed or can be provided by a user or can be dynamically set using feedback indicating image quality. The filter would also provide a solution for other sensors such as CCD, although a single chip solution would likely not be possible.

8 Claims, 3 Drawing Sheets

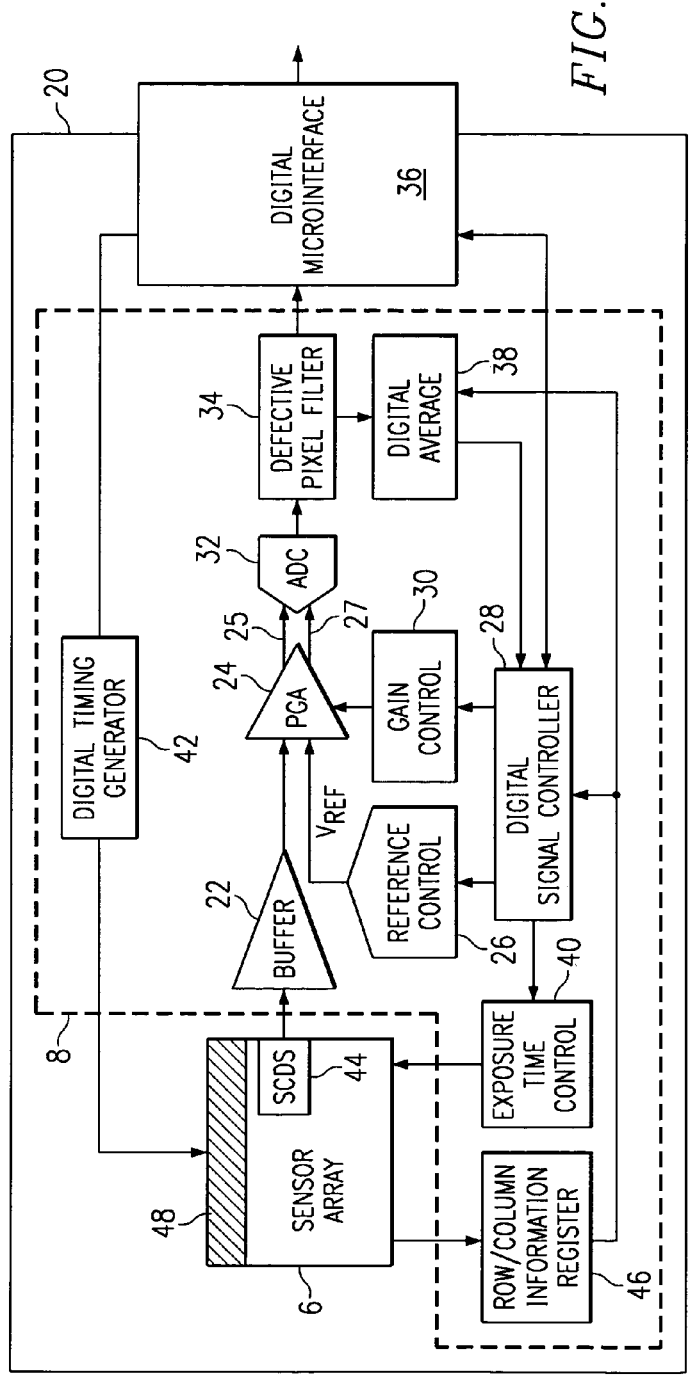
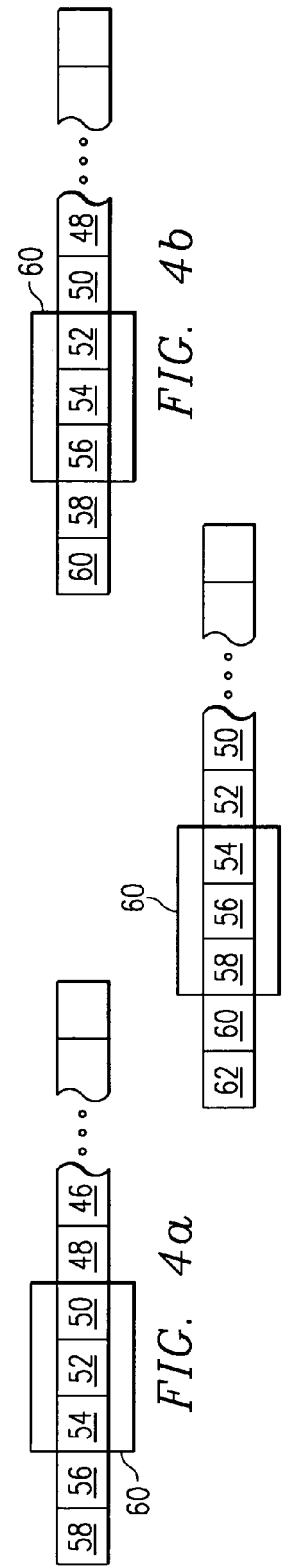

DEFECTIVE PIXEL FILTERING FOR DIGITAL IMAGERS

CROSS REFERENCE TO RELATED APPLICATION

This application claims benefit of U.S. Provisional Patent Application 60/124,408, filed on Mar. 15, 1999 and U.S. Non-Provisional Patent Application 09/475,652, filed Dec. 30, 1999 now abandoned, which application is incorporated herein by reference.

This application is related to commonly assigned, co-pending application Ser. No. 09/475,901 now U.S. Pat. No. 6,788,340, entitled Digital Imaging Control with Selective Intensity Resolution Enhancement filed concurrently herewith and incorporated herein by reference.

FIELD OF THE INVENTION

This invention relates generally to digital imaging devices and specifically to adjustable defective pixel filtering techniques and circuits.

BACKGROUND OF THE INVENTION

Digital imaging devices are becoming increasingly popular in a variety of applications, including digital cameras, fingerprint recognition, digital scanners and copiers, and the like. Typical prior art digital imaging devices are based on charge coupled device (CCD) technology. CCD devices have an array of CCD cells, each cell comprising a pixel. Each CCD pixel outputs a voltage signal proportionate to the intensity of light impinging upon the cell. This analog voltage signal can be converted to a digital signal for further processing, digital filtering, storage and the like. As is well known in the art, a two dimensional digital image can be constructed from the voltage signals output from a two-dimensional array of CCD cells, commonly referred to as a sensor array.

CCD arrays have a shortcoming in that CCD fabrication requires a special process that is not compatible with standard CMOS processes. Thus, the CCD array cannot be easily integrated with other logic circuits, such as CCD control logic, analog to digital converters, and the like. Additionally, in operation a CCD array requires multiple high voltage supplies from 5V to 12V and CCD arrays tend to consume a large amount of power in use.

An alternative to CCD arrays is using an array formed of CMOS cells. A CMOS sensor array can be fabricated using standard CMOS processing and thus can be integrated onto a single chip with other circuits, such as array control logic, analog to digital converters (A/D's), digital signal processing (DSP) cores, and the like. CMOS arrays provide the additional advantage of operating with a single low supply voltage such as 3.3V or 5V, and consuming less power than a comparable CCD array. Finally, a CMOS array can be fabricated at a lower cost than a similar CCD array.

One common problem with both CCD and with CMOS imagers is that of point defects which cause "spot noise" on the image, such as white spots on a dark portion of the image or a dark spot on a white portion of the image. In CMOS imagers, white spots are due to pixels (i.e. CMOS cells) with excessive leakage current. Dark spots are due to either particles covering the pixel or a defect in the pixel electronics causing the pixel not to turn on. Spot noise seriously limits the yield of CMOS imagers, resulting in increased costs.

One method to remove spot noise electronically has been proposed by Younse et al. in U.S. Pat. No. 4,805,023. The Younse et al. implementation requires expensive EPROM memory and involves a complicated hardware system, further increasing the imager cost. Furthermore, the solution proposed by Younse et al. cannot remove temperature dependent spot noise, such as white spots appearing only at high temperatures.

Therefore, a need exists for a relatively inexpensive defective pixel filter that can quickly and reliably filter out the effects of defective pixel such as spot noise from an image signal.

SUMMARY OF THE INVENTION

In one aspect, the present invention provides a digital imaging device comprising a substrate, a sensor array formed on the substrate, the array generating an electrical signal corresponding to the amount of light impinging upon the array, and imaging logic formed on the substrate, coupled to the sensor array and receiving the electrical signal. The imaging logic includes an analog to digital converter receiving the electrical signal and outputting digital pixel values and a defective pixel filter receiving the digital pixel values and detecting defective pixels on the basis of variations between a selected pixel value and its neighboring pixel values.

In another aspect, the invention provides for a method for detecting a defective pixel based upon the luminance values generated by the pixel element and its two nearest neighbors. The method includes determining a first difference value between the luminance value of the pixel and the luminance value of a first neighboring pixel and comparing the first difference value to a pre-determined threshold value. The method also includes determining a second difference value between the luminance of the pixel and the luminance value of a second neighboring pixel and comparing the second difference value to the pre-determined threshold value. Finally, the method includes detecting whether the luminance value for the pixel falls within an acceptable range defined by the luminance value for the first neighboring pixel and the luminance value for the second neighboring pixel and identifying the pixel element as defective if the luminance value for the pixel element does not fall within the acceptable range and neither the first difference value nor the second difference value is less than or equal to the threshold value.

In another aspect, the present invention provides for a digital imager comprising a lens mechanism, a sensor array positioned within a focal plane of said lens mechanism, and an analog buffer and amplifier coupled to an output of said sensor array, and imaging logic coupled to said amplifier. The imaging logic includes a defective pixel filter comprising means for detecting whether a first pixel is outside an acceptable range defined by luminance values of first and second neighboring pixels, means for determining whether said first pixel deviates from said first neighboring pixel by greater than a threshold value and means for determining whether said first pixel deviates from said second neighboring pixel by greater than a threshold value, means for calculating a corrected pixel value, and means for substituting said corrected pixel value for said first pixel if said first pixel is outside said acceptable range and said first pixel deviates from said first neighboring pixel by greater than a threshold value and said first pixel deviates from said second neighboring pixel by greater than a threshold value.

BRIEF DESCRIPTION OF THE DRAWINGS

The above features of the present invention will be more clearly understood from consideration of the following descriptions in connection with accompanying drawings in which:

FIG. 2 is a block diagram of a preferred embodiment single chip CMOS imager;

FIGS. 4a through 4c illustrate the preferred embodiment defective pixel filter operating as a moving window of analysis;

DETAILED DESCRIPTION OF ILLUSTRATIVE EMBODIMENTS

The making and use of the various embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not limit the scope of the invention.

Figure 1:
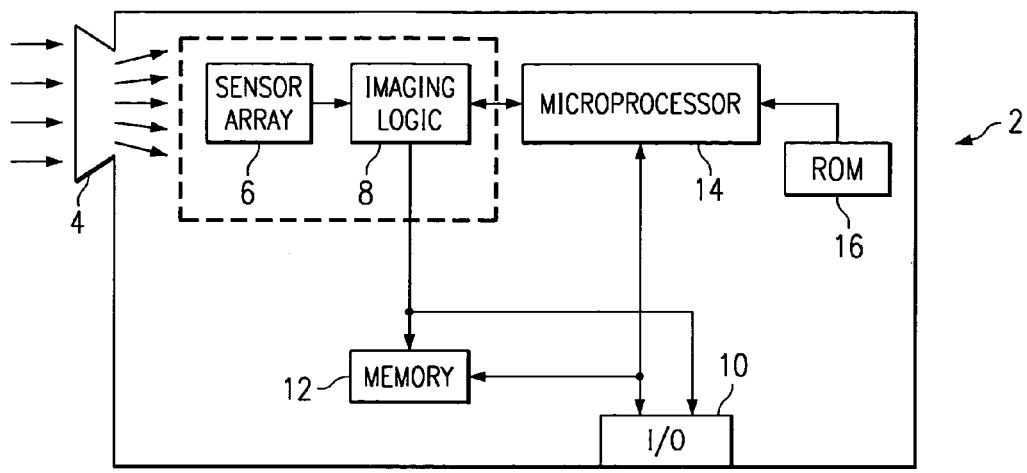
FIG. 1 illustrates a digital imaging device in which preferred embodiments of the invention may be employed.

FIG. 1 illustrates a digital imaging device 2 utilizing preferred embodiments of the present invention. Digital imaging device 2 includes a lens mechanism 4 which receives light emanating or reflected from an object to be imaged and focuses the incoming light upon an array sensor 6. Array sensor 6 is preferably a CMOS sensor array of the type fully described in co-pending patent application Ser. No. 09/223,166, entitled Fast Frame Readout Architecture for Array Sensors with Integrated Correlated Double Sampling System, which application is incorporated herein by reference. As will be known to one in the art, sensor array 6 is comprised of a two dimensional array of CMOS sensors, each sensor corresponding to a pixel of the resulting image. Each sensor outputs an analog voltage signal, which signal is proportionate to the intensity of light impinging upon the particular sensor. The voltage signal from each sensor can be scanned in a raster format as is well known in the art to generate an analog image signal. This analog image signal is fed to imaging logic 8 where the analog signal is buffered and amplified before being converted to a digital signal. The digital signal can be filtered or further processed before being passed to input/output (IO) port 10 in the form of pixel intensity data. Alternatively, with additional signal processing, the digital signal can be output in the form of a bitmap or other well known digital picture format.

Alternatively, the digital signal can be passed to memory 12 for storage. Memory 12 is preferably random access memory or static random access memory. Alternatively, memory 12 could be a magnetic or optical storage device, such as a magnetic diskette device, a CD-ROM, or other storage device. In such case, an appropriate device controller and interface (not shown) would be included along with memory 12. Imaging logic 8, memory 12, and I/O port 10 are preferably under the control of microprocessor 14, which is preferably a general purpose digital microprocessor operating under instructions stored in memory 12 or ROM 16. Stored instructions could also be provided via I/O port 10 directly to microprocessor 14, or stored in memory 12 or ROM 16.

In the preferred embodiment, sensor array 6 is formed of an array of CMOS sensor cells, thus allowing for imaging logic 8 to be formed using CMOS processes on a single integrated circuit along with sensor array 6. FIG. 2 illustrates a single integrated circuit (IC) 20, upon which is realized both sensor array 6 and imaging logic 8 according to the preferred embodiment of the invention. Other features and circuits may be included within IC 20 including internal control registers, microprocessor interface logic, memory interface logic, and the like. These features have not been illustrated as they are not necessary for an understanding of the present invention.

Further details of imaging logic 8 will now be described with reference to FIG. 2. The main path for imaging signals is indicated by heavy arrows. The analog signal from sensor array 6 is passed to buffer 22 where the signal is buffered to strengthen the signal and fixed pattern noise is removed. From buffer 22 the buffered analog signal is sent to a first input of programmable gain differential amplifier 24. The second input of amplifier 24 receives a reference voltage $V_{REF}$, which is fed from reference control block 26 under the control of digital signal controller 28. Amplifier 24 also receives a gain control signal from gain control block 30, which operates under the control of digital signal controller 28.

Amplifier 24 maps the two inputs to fully differential outputs 25 and 27. In other words, outputs 25 and 27 correspond to the difference between the value of the two input signals (i.e. the analog image signal and the reference voltage $V_{REF}$) multiplied by the gain value and centered about a common mode voltage level. These fully differential outputs 25 and 27 are then fed to the inputs of differential analog to digital converter 32 where the differential value (i.e. the difference between signals 25 and 27) is converted to a digital value. The resulting digital image signal is then passed to defective pixel filter 34 where image errors are detected and corrected, as described in detail below.

The corrected digital image signal is then passed to digital microinterface 36 which provides an interface between IC 20 and other components of digital imager 2, such as memory 12, microprocessor 14 or I/O port 10.

Also shown in FIG. 2 is digital timing generator 42 which provides timing signals for operation of sequential correlated doubling sampling block 44 in order to suppress CMOS sensor fixed pattern noise as taught in co-pending patent application Ser. No. 09/223,165, entitled Sequential Correlated Double Sampling Techniques for CMOS Area Array Sensors, which application is incorporated herein by reference. Row/column information register 46 provides information to digital signal controller 28 and digital averager 38 regarding where the signal currently being processed originated on the sensor array (i.e. provides row and column information for each pixel). Imaging logic 8 also includes a digital signal feedback loop comprising digital average calculator 38, digital signal controller 28, reference control block 26, gain control block 30, and exposure time control 40. This feedback loop is employed to provide for optical black calibration and for resolution enhancement by adjusting the reference voltage and gain for amplifier 24.

Further details regarding the design and operation of defective pixel filter 34 will now be discussed. Referring first to FIGS. 3a through 3j, each drawing illustrates a group of three neighboring pixels in the image signal. The pixels are illustrated as bars, which bars correspond to the luminance value for the given pixel. For instance in FIG. 3a, pixel B 52 has a luminance value greater than that of pixel A 50, and pixel C 54 has a luminance value greater than that of pixel B. Pixels A, B, and C correspond to three adjacent pixels in CMOS array 6. Under normal circumstances, one would not expect abrupt discontinuities in the change in luminance values. For instance, as the image changes from dark to light, the pattern shown in FIG. 3a, with the pixels having increasing values, would be expected. Likewise, in FIG. 3b, pixel B 52 is darker than pixel A 50, and pixel C 54 is darker than pixel B 52—indicating a normal transition from light to dark. Note that in both FIGS. 3a and 3b, the luminance for middle pixel B 52 falls in the range of values defined by the luminance for its neighboring pixels A 50 and C 54. By contrast, in FIG. 3c, middle pixel B 52 has a luminance that is greater than both its neighbors 50 and 54, indicating a discontinuity in the luminance trend for the image. Note, however, that pixel B 52 of FIG. 3c deviates from its nearest neighbor pixel C 54 by an amount t. The value t indicates a threshold deviation between neighboring pixels that can be tolerated before the middle pixel will be considered as defective. Likewise, in FIGS. 3d through 3f, even though the middle pixel B 52 does not fall between its neighboring pixels A 50 and C 54, the deviation from the nearest pixel value is equal to or less than t. By contrast, in FIGS. 3g through 3j middle pixel B 52 does not fall within the range of values between neighboring pixels A 50 and C 54, and also deviates from the value of the nearest pixel by more than the threshold amount t. Under the circumstances illustrated in FIGS. 3g through 3j, pixel B 52 will be considered to be defective.

In practice a row of pixels forming the image will be scanned with a moving three pixel window as shown in FIGS. 4a through 4b. Pixel data stream preferably consists of 10 bit luminance values for each pixel of CMOS array 6, which stream is fed to defective pixel filter 34. Defective pixel filter 34 applies a moving window 60 across the pixel data stream as it passes through the filter. In FIG. 4a, the first three pixels 50, 52, 54 of the stream are analyzed, with pixel 52 being the middle pixel B under consideration (as illustrated, pixel data is moving from right to left). In FIG. 4b, the moving window 60 has shifted one pixel or more accurately, the pixels moving through defective pixel filter 34 have shifted by one pixel, and pixels 52, 54, and 56 are then analyzed, with pixel 54 being the middle pixel B under consideration. Finally, in FIG. 4c, the moving window has again shifted by one pixel and pixels 54, 56, and 58 are analyzed, with pixel 56 being the middle pixel B under consideration.

In the event the pixel B under consideration is determined to fall outside the range of luminance values of its neighboring pixels A and C, and to deviate from its nearest neighboring pixel by more than the threshold t, then that pixel will be flagged as defective. In the preferred embodiments, the luminance value for the defective pixel will be replaced with an interpolated luminance value based upon the values of neighboring pixels A and C.

Figure 5:
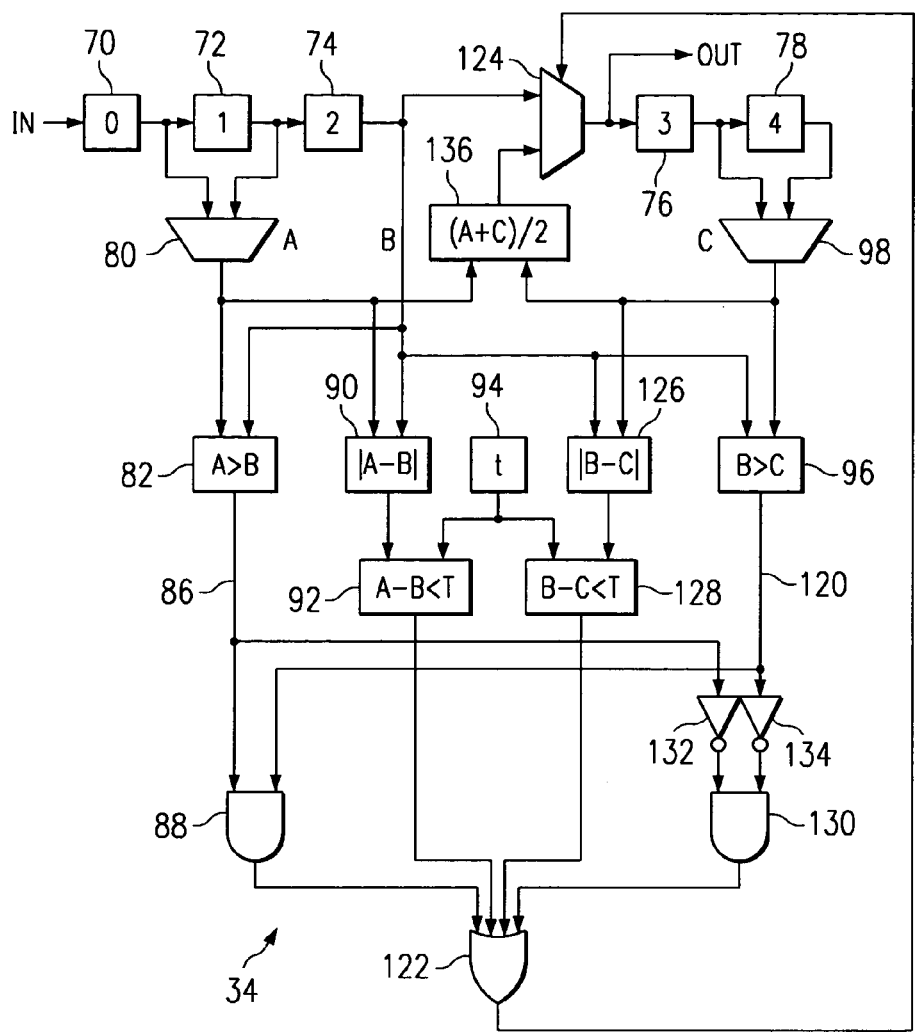
FIG. 5 schematically illustrates a first preferred embodiment circuit for filtering out defective filters.
Figure 6:
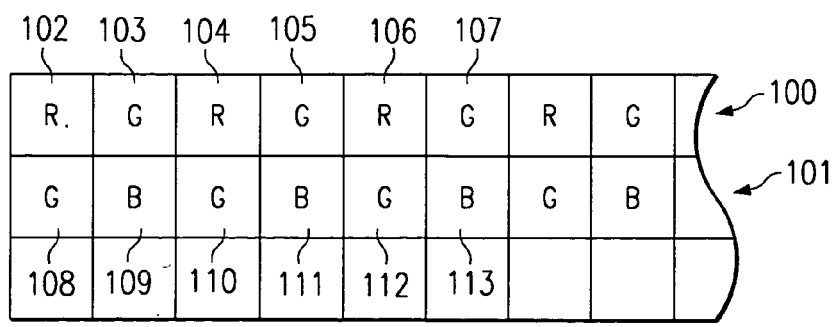
FIG. 6 illustrates a portion of a color sensor array.

Further details regarding the defective pixel filter 34 is provided with reference to FIG. 5. Incoming pixel data is fed to a first in first out (FIFO) register comprising registers cells 70, 72, 74, 76, and 78. While the preferred embodiment provides for the advantageous feature that defective pixels are identified and corrected for in real-time without the need for large memory storage, other embodiments might provide for a RAM, SRAM or other type memory in which incoming pixel data is fed and stored. Note that five pixels are loaded into the FIFO registers even though only three pixels are analyzed at one time. This is because defective pixel filter 34 can be configured for both monochrome images and for color images. As is known in the art, color image sensors interlace the pixel sensors on each row in a Bayer pattern, as illustrated in FIG. 6, which illustrates a portion of a color image sensor. In the first row 100 of the array, red sensors 102, 104, 106 are interlaced with green sensors 103, 105, 107. In the second row 101, green sensors 108, 110, 112 are interlaced with blue sensors 109, 111, and 113. Clearly it is desirable to compare adjacent pixels of the same type (i.e. comparing red pixels to red pixels). For this reason, every other pixel should be selected for analysis, for instance pixels 102, 104, and 106 would be analyzed to determine if pixel 104 was defective. Next, pixel 105 would be compared to like pixels 103 and 107. Otherwise, if the (green) value for pixel 103 was compared to the (red) values of pixels 102 and 104, it would be very likely to have abrupt discontinuities, even though pixel 103 was functioning normally. For instance, for a portion of the image in which the image was primarily red, pixels 102 and 104 would be expected to have high luminance values and pixel 103 would be expected to have very low luminance values.

Therefore, in monochrome mode, pixel A is selected from register 72, pixel B is selected from register 74 and pixel C is selected from register 76. In color mode, pixel A is selected from register 70, pixel B is selected from register 74, and pixel C is selected from register 78, in order to ensure that like pixels are being compared.

Multiplexer 80 selects pixel A from either register 72 or from register 70 depending on whether the device is in monochrome or color mode, and feeds the pixel value to comparator 82. In comparator 82, the value of pixel A is compared to the value of pixel B from register 74. If the comparison indicates pixel A has a greater value than pixel B, a valid logic signal (logical high) is asserted on signal line 86, which is connected to one input of a two input AND gate 88. The other input to AND gate 88 is fed from comparator 96 wherein the value for pixel B is compared to the value for pixel C. Pixel C is selected by multiplexer 98 from either register 78 or register 76, depending upon whether the device is in monochrome or color mode. If pixel B is greater than pixel C, then comparator 96 will assert a valid signal on signal line 120, which is fed to the second input of AND gate 88. If both inputs to AND gate 88 are high (indicating that A is greater than B and B is greater than C), AND gate 88 will assert a valid signal (logical high) to four input OR gate 122. This condition corresponds to the situation illustrated graphically in FIG. 3b, which is an acceptable situation indicating that pixel B is valid. Logical OR gate 122 will assert a valid signal (logical high) to multiplexer 124, which will in turn allow the value for pixel B, from register 74, to be output from defective pixel filter 34 for further processing. Note that for convenience, a logical high signal will be treated as indicating a valid signal, although in other embodiments, a logical low signal could be used for a valid logic signal.

At the same time, the difference in the values of pixel A and pixel B is calculated in block 90 and the difference is compared to threshold t in comparator 92. Note that the value for threshold t can be selected by a user and stored in register 94. Alternatively, or if no value for t is selected by the user, a default value for t can be stored in register 94. In some embodiments, the threshold value can be automatically generated based upon an iterative process in which a feedback signal indicative of image quality is compared to a varying value for t until a threshold value is reached that effectively cancels out defective pixels without canceling out desired luminance variations that occur naturally in the image.

Figure 3A:
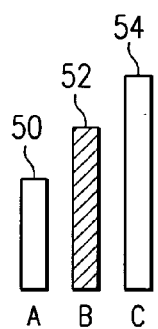
FIGS. 3a through 3j illustrate various acceptable and unacceptable variations between neighboring pixels.
Figure 3B:
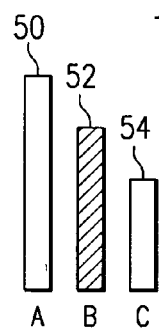
Figure 3C:
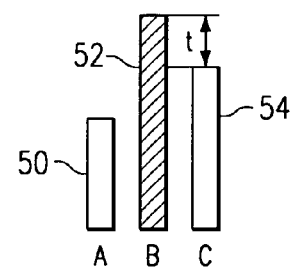
Figure 3D:
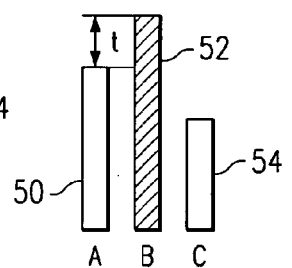
Figure 3E:
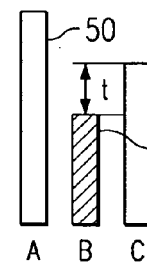
Figure 3F:
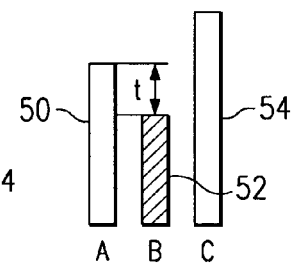
Figure 3G:
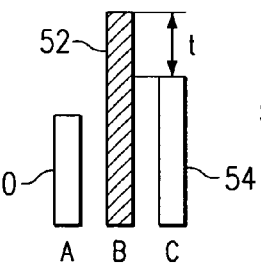
Figure 3H:
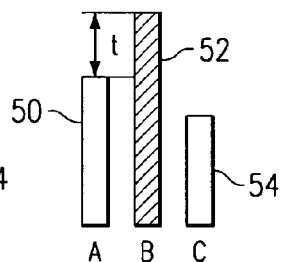
Figure 3I:
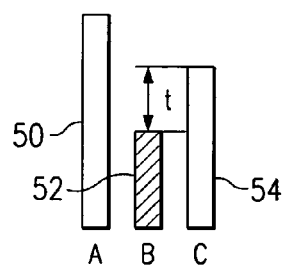
Figure 3J:
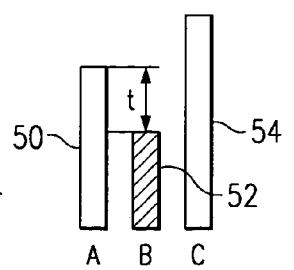

If the difference between pixels A and B is less than or equal to the threshold, this also indicates the pixel B is valid, corresponding to the condition in FIG. 3d or 3f. Note that it does not matter whether pixel B is greater than or less than pixel A, as long as the difference is less than or equal to the threshold. If so, then comparator 92 will output a logical high to OR gate 122, which will also cause multiplexer 124 to allow pixel B to be passed.

Likewise, if the difference between pixels B and C is less than or equal to the threshold value, corresponding to FIG. 3c or 3e, than pixel B is valid (regardless of the difference in value between pixels A and B). This condition is determined by block 126 and comparator 128 and if the difference between pixels B and C is less than t, a logical high is asserted to OR gate 122 and the value for pixel B is passed to the output from register 74 via multiplexer 124.

The fourth input of OR gate 122 is fed from AND gate 130. The first input to AND gate 130 is the inverted output of comparator 82 (via inverter 123) and the second input is the inverted output of comparator 96 (via inverter 134). AND gate 130 will output a valid signal (logical high) to OR gate 122 when pixel C is greater than pixel B and pixel B is greater than pixel A. This corresponds to FIG. 3a.

If none of the above conditions are met, the inputs to OR gate 122 will be logical lows, and hence the control input to multiplexer 124 will be a logical low. This indicates that pixel B is defective (corresponding to one of the conditions of FIGS. 3g through 3j). Under those circumstances, multiplexer 124 will pass a corrected pixel B value to the output. This corrected pixel value is calculated in block 136. In the preferred embodiments, corrected pixel B value is calculated from the average value of its neighboring pixels A and C, in other words $B_{corrected}=(A+C)/2$. The advantage of using a simple interpolation between pixels A and C is that those values are already stored in the FIFO register. More complex interpolations could be employed to generate the value for $B_{corrected}$, such as using the values of the nearest two or three neighbors on either side of B, but such interpolations would require additional storage elements in which the neighboring pixel values are stored and would also require additional combinational logic (with its associated costs and real estate requirements).

In the preferred embodiments, the circuit of FIG. 5 is realized in combinational logic on a semiconductor chip using CMOS fabrication processes. Advantageously, the preferred embodiment filter is fabricated on the same chip as the sensor array, as provided for with a CMOS sensor array. While other types of arrays such as CCD array may also be used, they may not be as desirable for reasons of processing differences. In other embodiments, the function could be achieved by a microprocessor running a sequence of program instructions. Alternatively, the circuitry could be realized in programmable gate array logic or other programmable logic.

As will be apparent from the above description, the preferred embodiments provide several advantageous features including the ability to eliminate temperature and time dependent pixel defects and the ability to filter both white pixels and dark pixels with adjustable thresholds. The adjustable threshold feature allows compensation for image spatial frequency and for degree of array pixel defects. Additionally, the preferred embodiments operate at high speed in real time and do not require a frame or line memory to store an entire frame or line of data. Both logic and sensor array can be formed on a single chip and are compatible with CMOS operations. The method can be employed at wafer probe in order to determine wafer yield and is operable in either color or monochrome image modes. The described embodiments maintain high frequency edge components, such as a rapid transition from a dark to very bright object, or from a bright to dark object.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A defective pixel filter comprising:
a first comparator circuit receiving as input a first pixel value and a second pixel value and outputting a valid logic signal to a first input of an AND circuit and to a first inverter when the first pixel value is greater than the second pixel value;
a first difference calculator receiving as input said first pixel value and said second pixel value and outputting to a first input of a second comparator circuit a first difference value corresponding to the difference between said first and second pixel values;
said second comparator circuit also receiving as input a threshold value and outputting a valid logic signal to a first input of an OR circuit when the first difference value is less than or equal to said threshold value;
a third comparator circuit receiving as input said second pixel value and a third pixel value and outputting a valid logic signal to a second input of said first AND circuit and to a second inverter when the second pixel value is greater than the third pixel value; and
a second difference calculator receiving as input said second pixel value and said third pixel value and outputting a second difference value corresponding to the difference between said second and third pixel values to a first input of a fourth comparator circuit;
said fourth comparator circuit also receiving as input a threshold value and outputting a valid logic signal to a third input of said OR circuit when the second difference value is less than or equal to said threshold value; and
a second AND circuit coupled to said first and second inverters and having an output coupled to a fourth input of said OR circuit.

2. The defective pixel filter of claim 1 further comprising:
a corrected pixel calculation block receiving as input said first and third pixel values and outputting a corrected pixel value;
a multiplexer having a first input coupled to the output of said corrected pixel calculation block, and receiving as a second input said pixel value, and having a control input coupled to an output of said OR circuit.

3. The defective pixel filter of claim 1 further comprising registers for storing pixel values.

4. The defective pixel filter of claim 1 being operative in both monochrome and color mode and further comprising at least one multiplexer receiving as input the pixel values stored in at least two registers, and outputting one of said pixel values in response to an indication of monochrome or color mode operation.

5. The defective pixel filter of claim 1 wherein said first, second, and third pixel values are ten bit digital values.

6. The defective pixel filter of claim 1 further comprising a threshold value register in which is stored said threshold value.

7. The defective pixel filter of claim 1 wherein said comparator circuits, difference calculators, and registers are fabricated with CMOS processes.

8. The defective pixel filter of claim 1 wherein said comparator circuits and difference calculators are formed by a general purpose microprocessor running programmed instructions.

* * * * *